United States Patent
Bacchus

(10) Patent No.: US 10,882,469 B1
(45) Date of Patent: Jan. 5, 2021

(54) PROTECTIVE BEDLINER

(71) Applicant: Kyle C. Bacchus, Naples, FL (US)

(72) Inventor: Kyle C. Bacchus, Naples, FL (US)

( * ) Notice: Subject to any disclaimer, the term of this patent is extended or adjusted under 35 U.S.C. 154(b) by 0 days.

(21) Appl. No.: 16/110,257

(22) Filed: Aug. 23, 2018

(51) Int. Cl.
*B60R 13/01* (2006.01)
*B62D 33/03* (2006.01)
*B62D 33/027* (2006.01)

(52) U.S. Cl.
CPC .......... *B60R 13/01* (2013.01); *B62D 33/0273* (2013.01); *B62D 33/03* (2013.01); *B60R 2013/016* (2013.01)

(58) Field of Classification Search
CPC ....... B60R 13/01; B60R 13/013; B60R 13/04; B60R 2013/016; B62D 33/02; B62D 33/027; B62D 33/03
USPC .......................................................... 296/39.2
See application file for complete search history.

(56) References Cited

U.S. PATENT DOCUMENTS

| | | | |
|---|---|---|---|
| 5,167,433 A | 12/1992 | Ryan | |
| 5,201,562 A * | 4/1993 | Dorsey | A61H 33/028 296/37.6 |
| 5,221,119 A * | 6/1993 | Emery | B60R 13/01 220/495.01 |
| 6,042,169 A * | 3/2000 | Emery | B60R 13/01 296/39.1 |
| 6,059,343 A * | 5/2000 | Emery | B60R 13/01 296/39.1 |
| 6,131,983 A * | 10/2000 | Jackson | B60R 13/01 296/39.1 |
| 6,206,443 B1 * | 3/2001 | Konop | B60R 13/01 229/164 |
| D483,314 S * | 12/2003 | Graves | B60R 13/01 D12/221 |
| 6,729,514 B1 | 5/2004 | Delgado | |
| 6,986,541 B1 * | 1/2006 | Haack | B62D 33/02 224/404 |
| 7,159,902 B2 * | 1/2007 | Carty | B60R 11/00 224/403 |
| 9,352,703 B2 | 5/2016 | Prestella | |
| 2008/0303303 A1 * | 12/2008 | Valentine | B60R 5/04 296/39.1 |
| 2009/0033121 A1 * | 2/2009 | McGorman | B65F 1/0006 296/39.1 |
| 2012/0068493 A1 * | 3/2012 | Waterman | B60R 13/01 296/39.2 |
| 2013/0323004 A1 * | 12/2013 | Bemis | B60P 1/64 414/800 |
| 2016/0082898 A1 * | 3/2016 | Prestella | B60R 13/01 296/39.2 |

OTHER PUBLICATIONS

Craiglist.com Printout.
Pickuppools.com Printout.

* cited by examiner

*Primary Examiner* — Gregory A Blankenship
(74) *Attorney, Agent, or Firm* — Bryan L. Loeffler, Esq.; Loeffler IP Group, PA

(57) ABSTRACT

A bedliner (1) used for protecting metal truck beds and utility trailers from chemicals, such as chlorine, transported therein which causes the metal in the bed to corrode and rust when the chemicals spill and come into direct contact with the metal, said bedliner having an upper protective lip (12) and accordion-like protective retention wall (17).

1 Claim, 2 Drawing Sheets

PROTECTIVE BEDLINER

FIELD OF THE INVENTION

This invention relates to truck bedliners and more particularly a bedliner for beds of vehicles, such as trucks and utility trailers, which protects the bed from coining into contact with corrosive chemicals commonly transported by pool technicians and other maintenance workers.

BACKGROUND OF THE INVENTION

Pool technicians and other maintenance workers commonly carry chemicals, such as chlorine, muriatic acid and so forth, which are corrosive to metals. These chemicals are commonly transported in the beds of vehicles, such as trucks and utility trailers.

It is easy to accidentally spill these chemicals during transport and/or when removing or replacing the containers holding these chemicals from the bed of a truck or utility trailer. Of course, salts, chlorines and other chemicals will corrode any metal it comes into contact with. This is a common problem that is evidenced by the numerous pool maintenance trucks one will see on the road having beds that are falling apart due to rust.

A conventional method of protecting a truck bed is to use a drop-in plastic bedliner. Drop-in bedliners are rigid structures formed to the contours of a specific vehicle model. Conventional bed liners cover the bed of the truck and then have a separate piece that covers the tailgate of the truck. These conventional bedliners leave the bed exposed between the bed and the tailgate, which leaves the opportunity for chemicals to come into contact with exposed metal. The chemicals can be spilled within the bed and pour out directly onto the bumpers. In addition, spilled chemicals may be washed out over the rear of the bed when an individual is spraying spilled chemicals out of the bedliner. Either way, chemicals are bound to come into contact with the metal bed, bumper and so forth and cause rust.

Therefore, a need exists for a bedliner for beds of vehicles, such as trucks and utility trailers, which fully protects the bed from exposure to corrosive chemicals commonly transported by pool technicians and other maintenance workers.

SUMMARY OF THE INVENTION

The primary object of the present invention is to provide a bedliner for beds of vehicles, such as trucks and utility trailers, which protects the bed from exposure to corrosive chemicals commonly transported by pool technicians and other maintenance workers.

The present invention fulfills the above and other objects by providing a bedliner used for protecting metal truck beds and utility trailers from chemicals, such as chlorine, which causes the metal in the bed to corrode and rust when the chemicals spill and come into direct contact with the metal. The bedliner is preferably a rectangular-shaped body having a floor, a front wall, a right side wall, a left side wall and a rear wall all preferably sealed at the corners to prevent liquids from escaping the bedliner. A protective lip preferably extends outward from an upper perimeter edge of the four side walls to cover the top surfaces of a truck or trailer bed's walls. The protective lip may be L-shaped to allow it to extend over exterior side surfaces of the bed walls to prevent chemicals from spilling on the outside of the bed when placing chemicals into the bed or removing chemicals from the bed.

At least one drain is preferably located on the rear wall of the bedliner in a location that is accessible by lowering a tailgate of the bed. The drain extends or is extendable from the bedliner over the tailgate via a pipe or hose to allow spilled chemicals in the bedliner to be rinsed out and drained away from the bed and tailgate, thereby preventing any contact between the chemicals and the vehicle.

The rear wall of the bedliner may be foldably attached to a rear edge of the floor via a sealed hinge that prevents liquids from reaching the bed. Side edges of the rear wall are preferably attached to rear edges of the right side wall and left side wall via protective extension walls, which may be flexible and/or accordion-shaped. This structure allows a tailgate on which the rear wall is mounted to be folded into a downward position when the tailgate is opened. The extension walls and sealed hinge prevent chemicals from spilling between the tailgate and the bed and from spilling off the sides of the tailgate, thereby allowing an individual to easily load the bed or unload the bed without fear of spilling chemicals on any metal parts of the vehicle.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
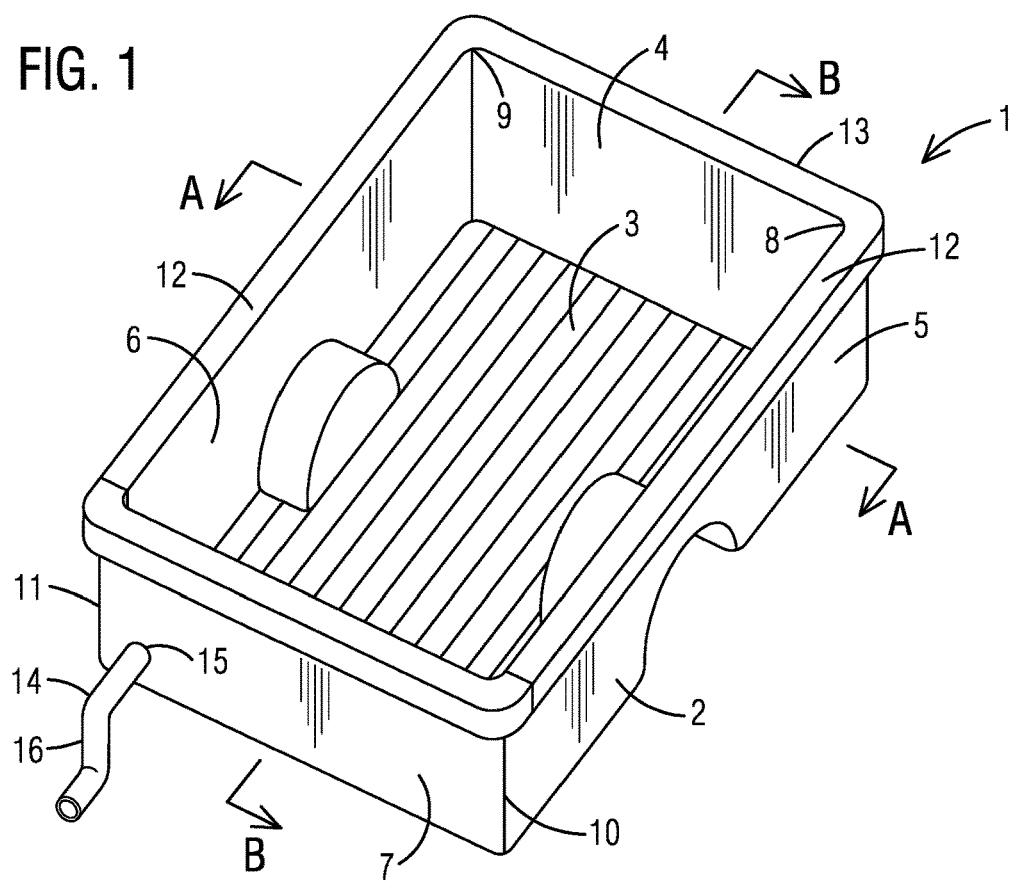
FIG. 1 is a perspective top view of a bedliner of the present invention having a drain extending from a rear wall.
Figure 2:
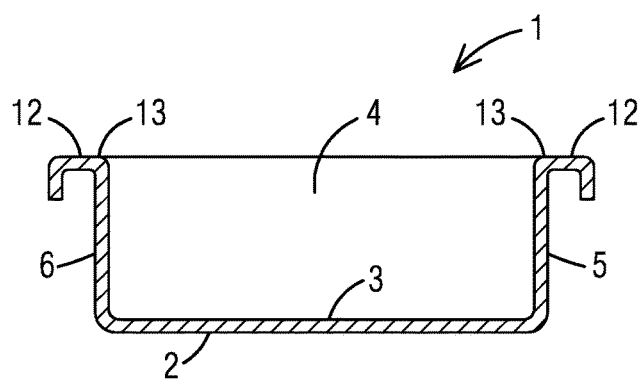
FIG. 2 is a cross sectional view along lines A-A of FIG. 1.
Figure 3:
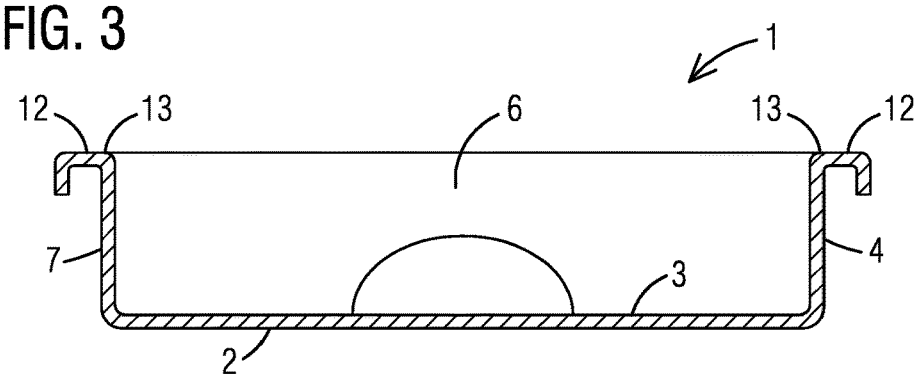
FIG. 3 is a cross sectional view along lines B-B of FIG. 1.

For purposes of describing the preferred embodiment, the terminology used in reference to the numbered accessories in the drawings is as follows:

1. bedliner
2. body of bedliner
3. floor
4. front wall
5. right side wall
6. left side wall
7. rear wall
8. front right corner
9. front left corner
10. rear right corner
11. rear left corner
12. protective lip
13. upper perimeter edge of body
14. drain
15. aperture
16. tubing
17. protective extension wall
17a. right side protective extension wall 17b. left side protective extension wall
18. rear edge of floor
19. sealed hinge
20. right side edge of rear wall
21. rear edge of right side wall
22. left side edge of rear wall
23. rear edge of left side wall With reference to FIG. 1, a perspective top view of a bedliner 1 of the present invention having a drain extending from a rear wall is illustrated. The bedliner 1 of the present invention comprises a substantially rectangular-shaped body 2 having a floor 3, a front wall 4, a right side wall 5, a left side wall 6 and a rear wall 7. A front right corner 8, front left corner 9, rear right corner 10 and rear left corner 11 are each preferably sealed to prevent liquids from escaping the bedliner 1. A protective lip 12 preferably extends outward perpendicularly from an upper perimeter edge 13 of the rectangular-shaped body 2. The protective lip 12 may be L-shaped, as illustrated in FIGS. 2 and 3, or u-shaped wherein a portion of the protective lip 12 is parallel to the front wall 4, right side wall 5, left side wall 6 and rear wall 7, respectively, thereby preventing chemicals from spilling on the outside of the a bed when removing chemicals from the bed.

At least one drain 14 is preferably located on the rear wall 7 of the bedliner 1 in a location that is accessible by lowering a tailgate of the bed. The drain 14 comprises an aperture 15 located on the rear wall 1 to which to an elongated rigid or flexible tubing 16, such as a pipe, hose and so forth, may be attached via an attachment means. The tubing 16 extends or is extendable from the bedliner 1 over an opened tailgate to allow spilled chemicals contained in the bedliner 1 to be rinsed out and drained away from the vehicle, thereby preventing any contact between the chemicals and the vehicle.

Figure 4:
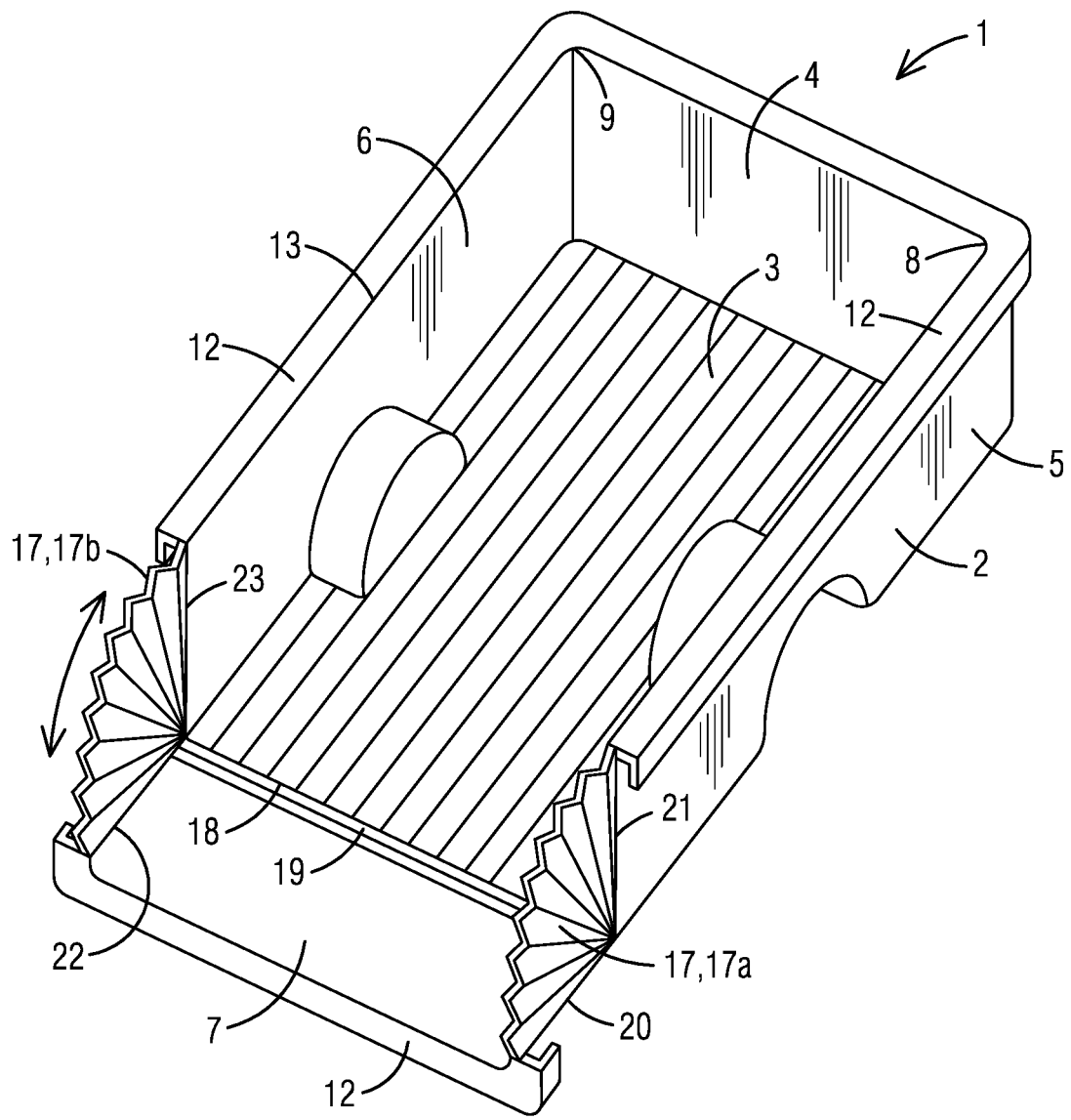
FIG. 4 is a perspective top view of a bedliner of the present invention having protective extension walls.

With reference to FIG. 4, a perspective top view of a bedliner 1 of the present invention having protective extension walls 17. The rear wall 7 may be foldably attached to a rear edge 18 of the floor 3 via a sealed hinge 19 that prevents liquids from reaching a bed in which the bedliner 1 is installed. A right side edge 20 of the rear wall 7 is preferably attached to a rear edge 21 of the right side wall 5 via a right side protective extension wall 17a, which may be accordion-shaped and/or constructed out of a flexible material. Likewise, the left side edge 22 of the rear wall 7 is preferably attached to a rear edge 23 of the left side wall 6 via a left side protective extension wall 17b, which may be accordion-shaped and/or constructed out of a flexible material. The protective extension walls 17 allow a tailgate on which the rear wall 7 is mounted to be folded into a downward position when the tailgate is opened, as illustrated in FIG. 4, thereby extending the protective extension walls 16 into extended open positions to prevent chemicals from spilling between the tailgate and the bed and from spilling off the sides of the tailgate onto the vehicle.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A bedliner for protecting a vehicle bed from liquid chemicals, said bedliner comprising:
   a unitary rigid rectangular-shaped body having a floor, a front wall, a right side wall, a left side wall, a rear wall and an L-shaped protective lip extending outward perpendicularly from upper perimeter edges of the front wall, right side wall, left side wall and rear wall to cover top surfaces of walls of a vehicle bed and a tailgate of the vehicle bed in a manner that allows the tailgate to freely open and close without moving the bedliner;
   a drain located on the body of the bedliner in a location that is accessible by lowering the tailgate of the vehicle bed; and
   said drain having a flexible tube attached thereto to allow spilled chemicals in the bedliner to be drained away from the vehicle bed and the tailgate, thereby preventing any contact between the chemicals and the vehicle bed and the tailgate.

\* \* \* \* \*